April 27, 1943.　　D. F. NEWMAN　　2,317,476
PROJECTION APPARATUS
Filed Feb. 14, 1941　　8 Sheets-Sheet 3
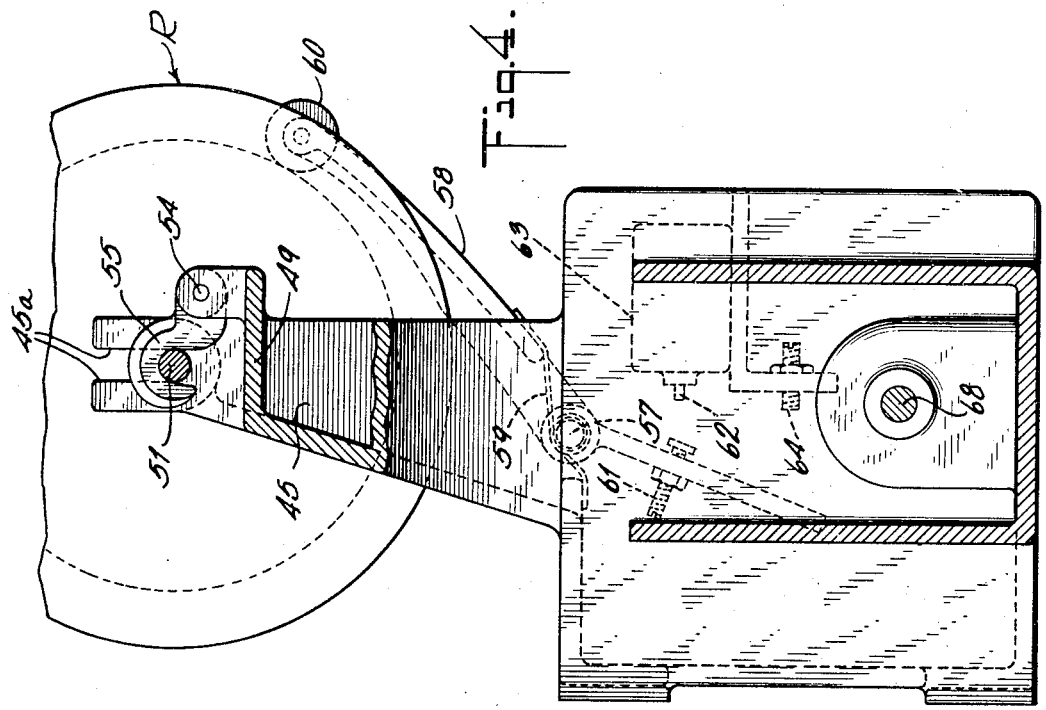
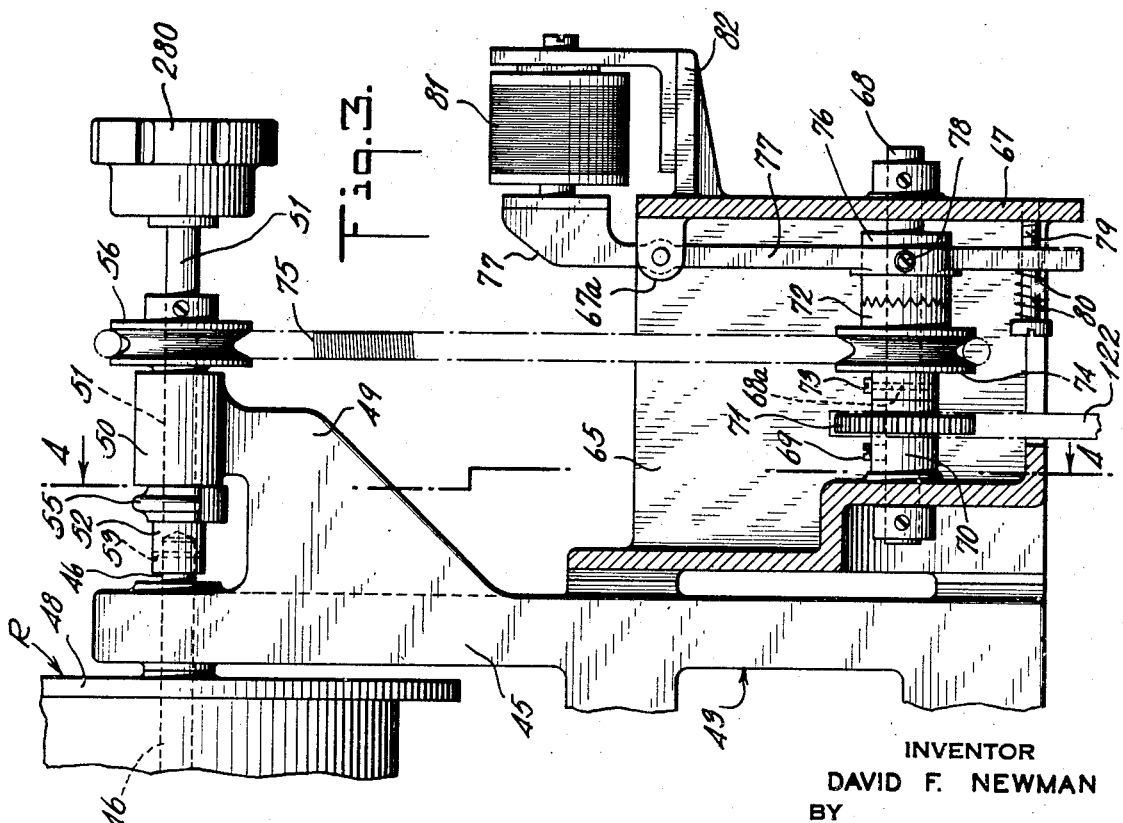
INVENTOR
DAVID F. NEWMAN
BY
Ward, Crosby & Neal
ATTORNEYS April 27, 1943.  D. F. NEWMAN  2,317,476
PROJECTION APPARATUS
Filed Feb. 14, 1941   8 Sheets-Sheet 4
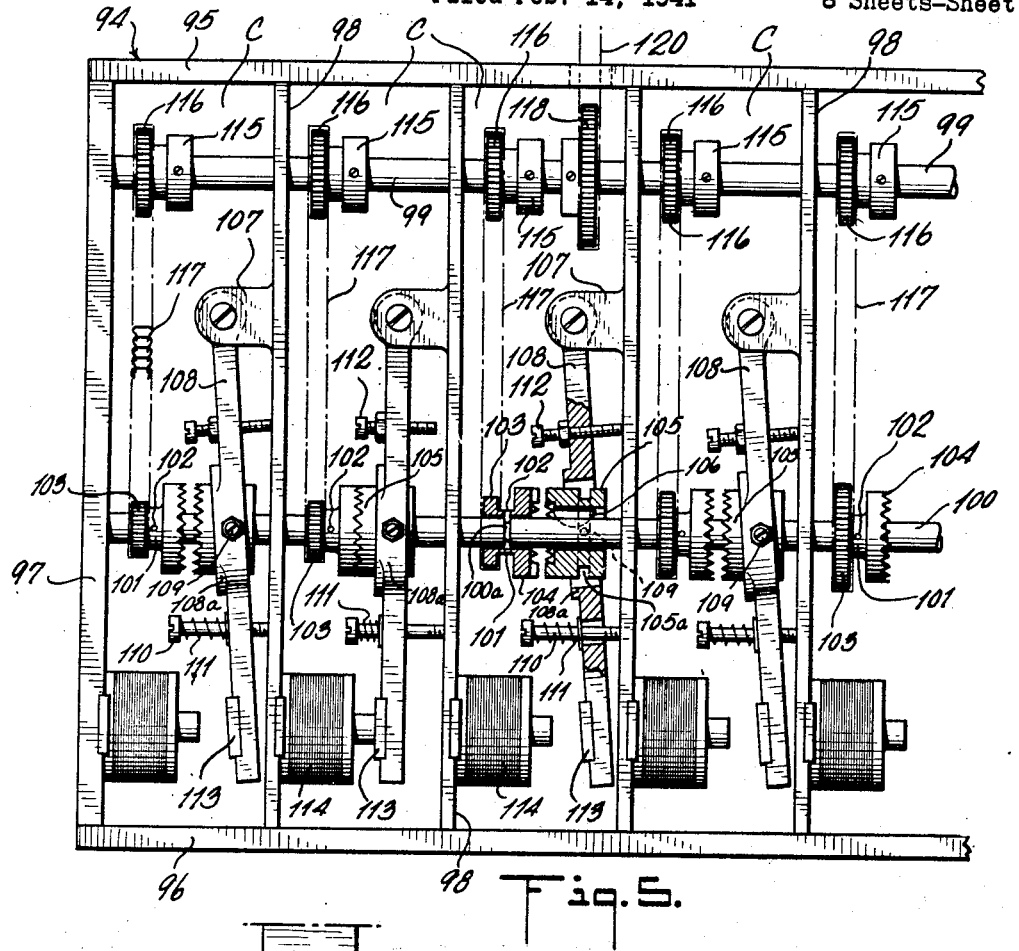
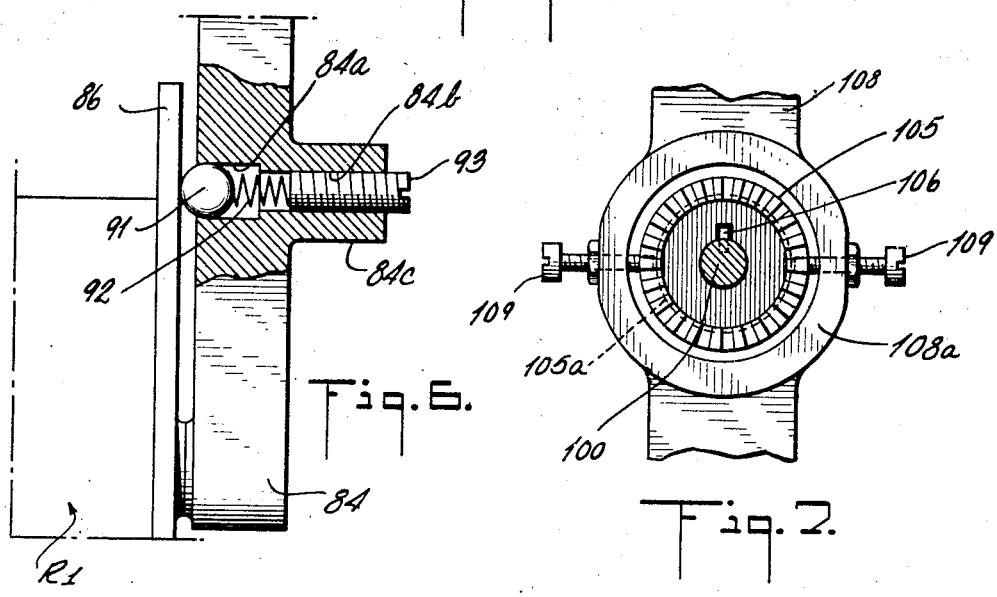
INVENTOR
DAVID F. NEWMAN
BY
Ward, Crosby & Neal
ATTORNEYS April 27, 1943.   D. F. NEWMAN   2,317,476
PROJECTION APPARATUS
Filed Feb. 14, 1941   8 Sheets-Sheet 5
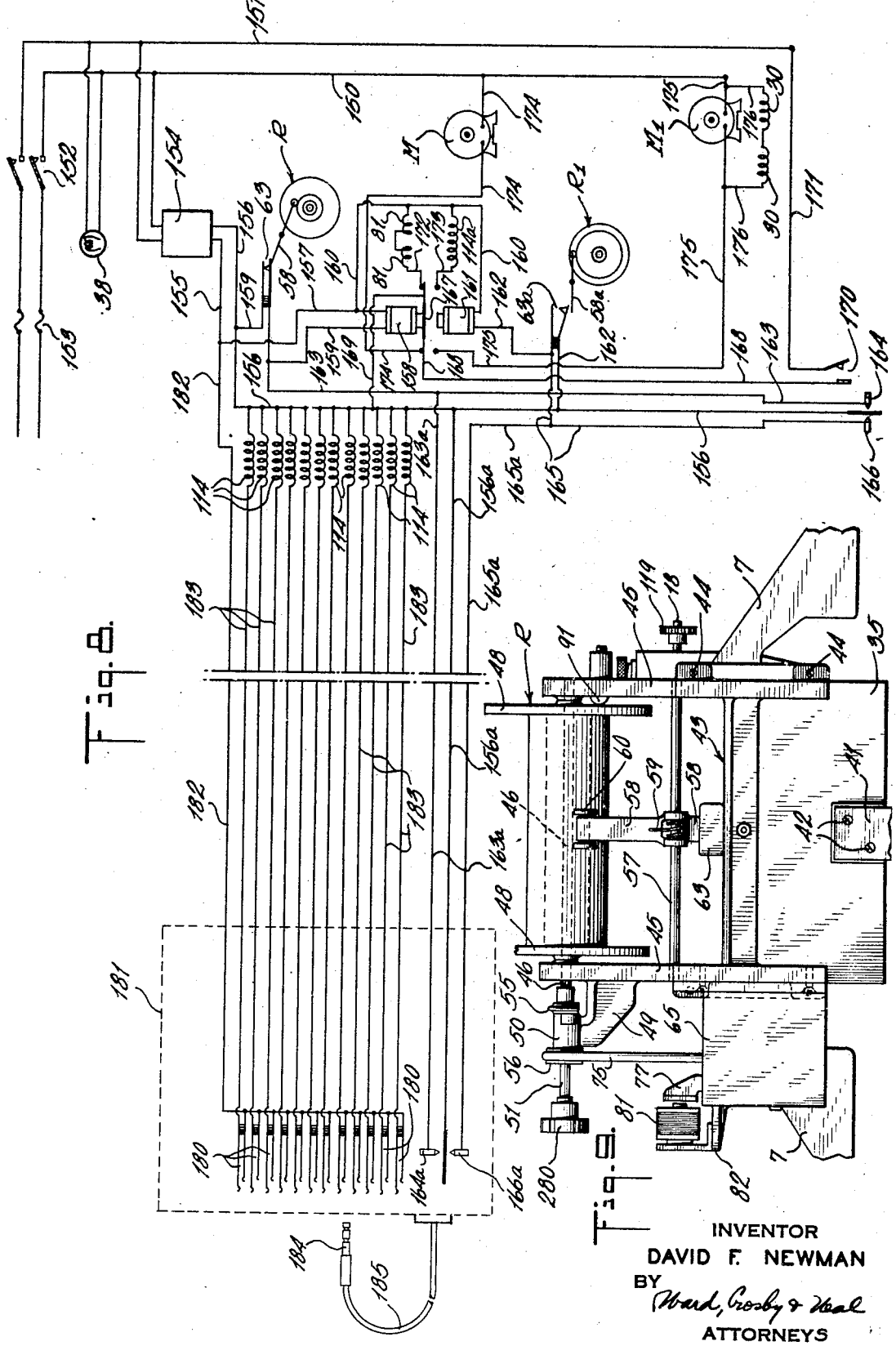
INVENTOR
DAVID F. NEWMAN
BY
*Ward, Crosby & Neal*
ATTORNEYS April 27, 1943.          D. F. NEWMAN          2,317,476
PROJECTION APPARATUS
Filed Feb. 14, 1941          8 Sheets-Sheet 6

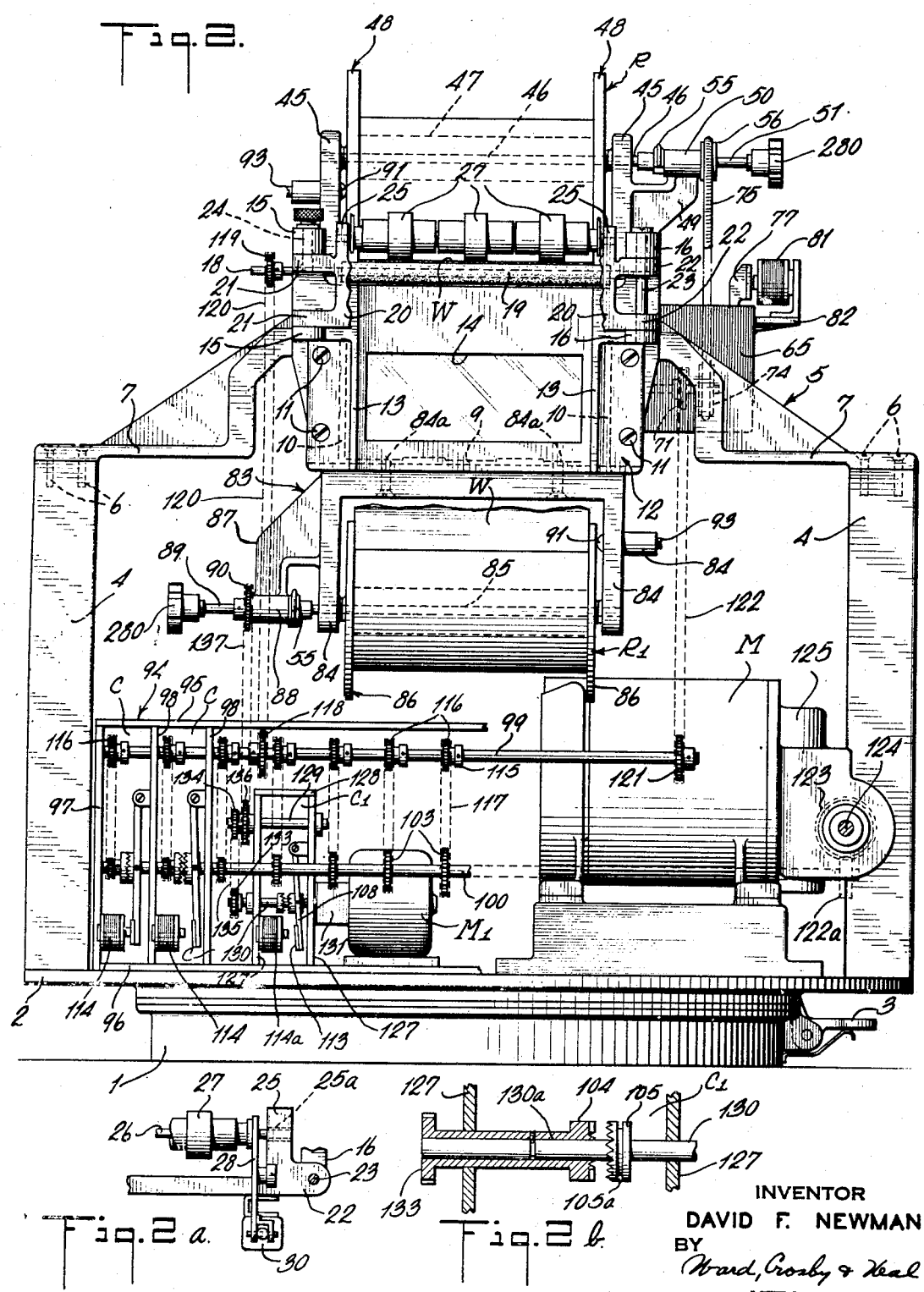

INVENTOR
DAVID F. NEWMAN
BY
Ward, Crosby & Heal
ATTORNEYS

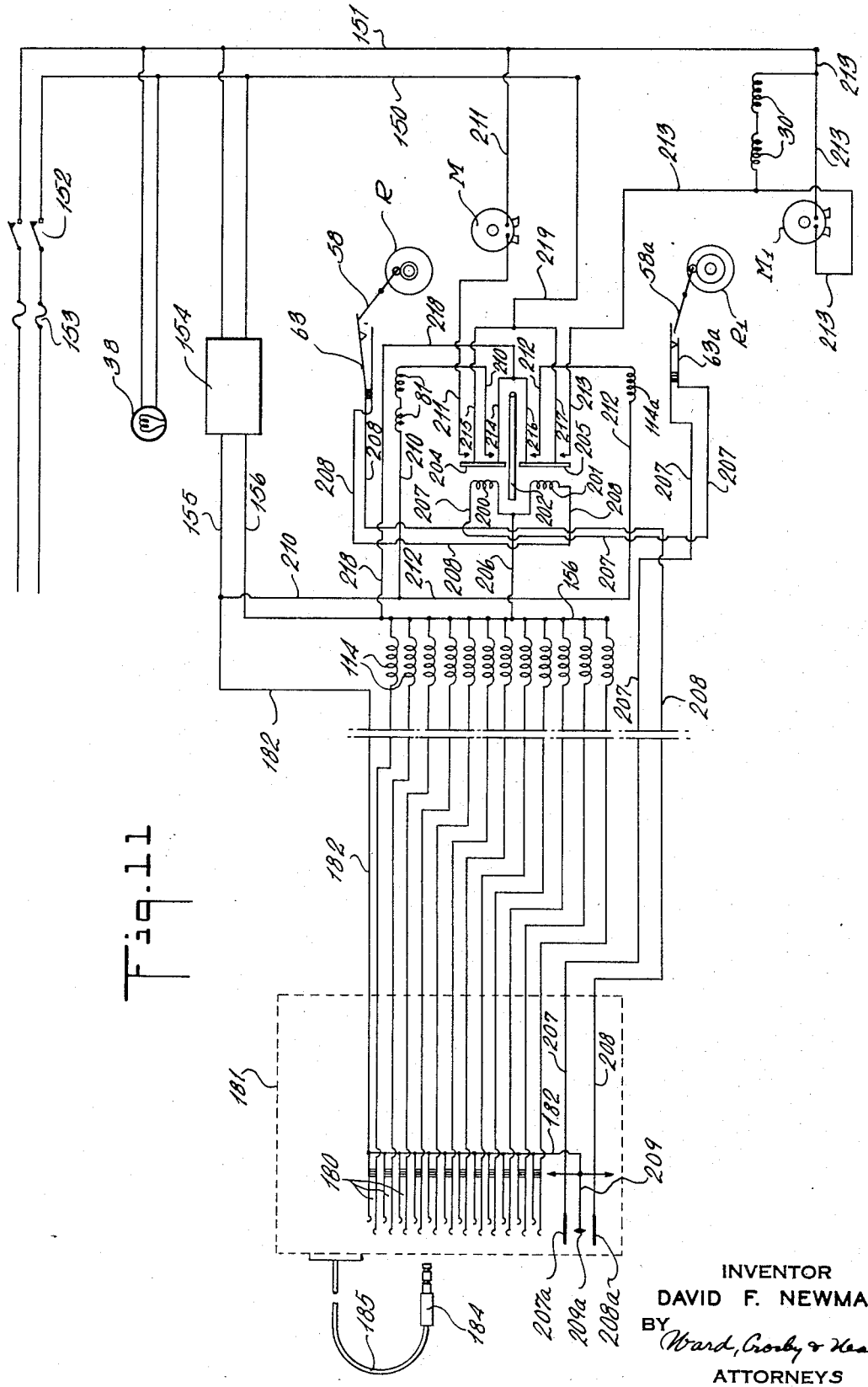

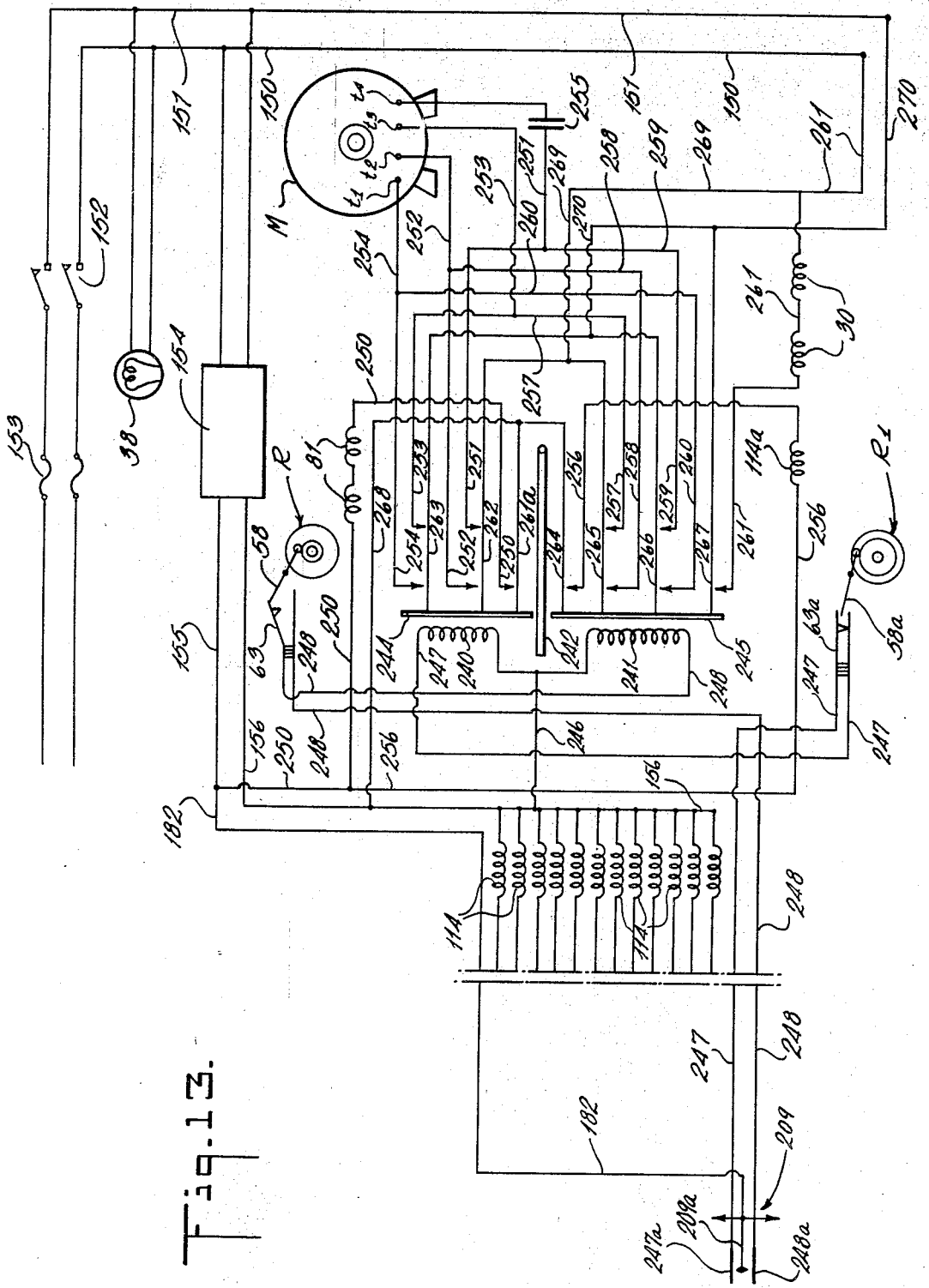

Patented Apr. 27, 1943

2,317,476

UNITED STATES PATENT OFFICE 2,317,476

PROJECTION APPARATUS

David F. Newman, Mountain Lakes, N. J., assignor to Trans-Lux Corporation, New York, N. Y., a corporation of Delaware Application February 14, 1941, Serial No. 378,892

5 Claims. (Cl. 88—24)

My invention relates to a structurally and functionally improved projection apparatus and in its more specific aspects aims to provide a unit of this character which will be of particular utility for instruction purposes.

It is an object of the invention to furnish a projection apparatus which may cooperate with an indicia-bearing member to project the characters appearing upon the latter onto a suitable receiving surface; the indicia-bearing member being moved with relation to the projection field of the apparatus at one of a number of different projection speeds.

A further object is that of furnishing a mechanism of this type and in which the speed of movement of the indicia-bearing member through the projection field may readily be controlled by the operator and without its being necessary that the latter have any particular skill or mechanical ability.

Another object is that of designing a projection apparatus which will be ideally suited for instruction purposes and the operation of which will be virtually automatic.

With these and other objects in mind, reference is had to the attached sheets of drawings illustrating practical embodiments of the invention, and in which:

Fig. 2 is a front elevational view, partly in section with parts omitted, showing the projector mechanism of Fig. 1;

Fig. 2a is a detailed fragmentary view, showing a feature of the invention;

Fig. 2b is an enlarged vertical sectional view, partly in elevation, showing a clutch arrangement;

Fig. 3 is an enlarged elevational view, partly in section, showing a clutch mechanism for rewinding the web after passage thereof through the projection field;

Fig. 4 is a vertical sectional view, partly in elevation, taken on the line 4—4 of Fig. 3 looking in the direction of the arrows;

Fig. 5 is an enlarged elevational view, partly in section, showing associated clutch units of the invention;

Fig. 6 is an elevational view, partly in section, showing an arrangement for retarding rotation of a web reel;

Fig. 7 is an elevational view, partly in section, showing a preferred manner of mounting a clutch element;

Fig. 8 is a diagram showing a circuit arrangement of the invention;

Fig. 9 is a rear elevational view, showing the upper part of the projector mechanism of Figs. 1 and 2;

Fig. 11 is a diagram showing another circuit arrangement of the invention;

Fig. 13 is a diagram showing a circuit arrangement utilizable with the form of the invention shown in Fig. 12.

In general, my invention relates to a projector mechanism adapted particularly for use in a classroom, or equivalent. In a business school, for example, when a group of students are learning to typewrite, it is desirable for each student, in one manner or another, to receive "dictation." By my invention, a projection screen is disposed in front of the class and lines of character images are caused to move across said screen at a constant rate of speed so as to provide group "dictation" for the entire class. More particularly, a selective arrangement is provided for causing the lines of character images to move across the screen at different constant speeds to thereby meet the requirements of different classes of students.

Figure 1:
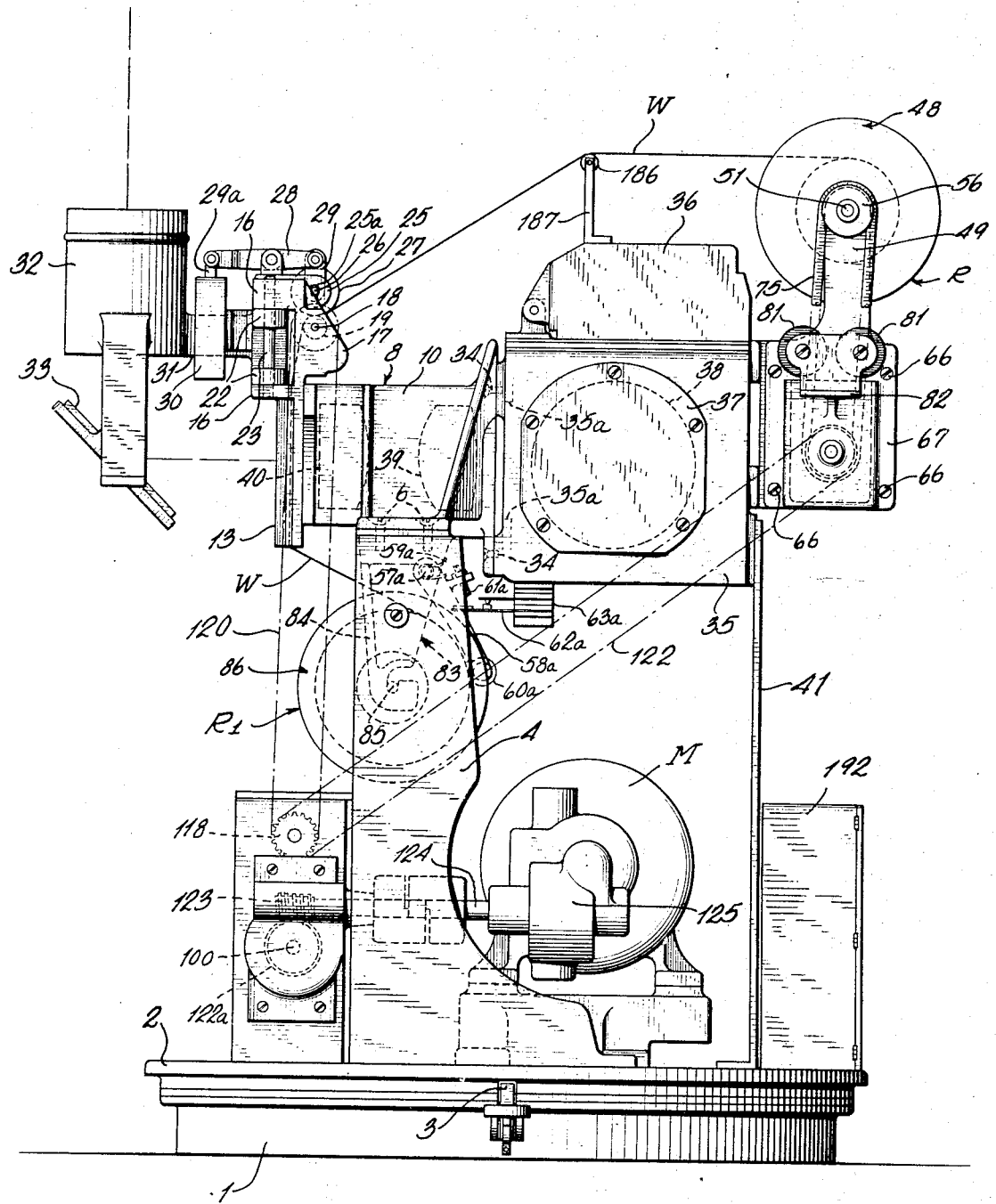
Figure 1 is a side elevational view, with parts omitted, showing the projector mechanism of my invention.

Referring to Figs. 1 and 2, I represents a suitable base adapted to rest upon the floor or other suitable supporting surface. Rotatably secured to the base 1 by centrally disposed spindle (not shown), is a platform 2 adapted to be detachably retained in predetermined position with respect to said base 1 by a latching member 3.

Upstanding from the platform 2 are a pair of vertical standards 4, 4 to which a horizontal structure 5 is secured by screws 6 or the like. Preferably, although not necessarily, the structure 5 is a casting and it comprises the oppositely extending wing sections 7, 7 between which is disposed a central housing 8 having a bottom wall 9 and spaced vertical side walls 10, 10.

The housing 8 terminates in a plane vertical front surface to which, by screws 11 or the like, is secured a frame 12 having on the front surface thereof a pair of spaced vertical tracks 13, 13 between which said frame 12 comprises an aperture or passage 14 of oblong, rectangular configuration, this aperture or passage 14 serving as the projection field of the apparatus herein disclosed.

The frame 12, at each side thereof and in the upper forward area thereof, comprises the pairs of spaced ears 15 and 16, each ear, with the exception of the lower ear 15 at the left, Fig. 2, being provided with a vertical passage, the passages in the pair of ears 16 being vertically alined.

The frame 12, at each side thereof and in the upper rear area thereof, comprises the respective, enlarged bearing sections 17, 17 in which a horizontal shaft 18 is journalled, the shaft 18, between the bearing sections 17, 17 carrying the web-pulling roller 19.

Coactable with the frame 12 is a gate 20 which, at each side thereof, comprises a pair of spaced ears 21 and 22, the pair of ears 21 being received between the aforesaid ears 15 and the ears 22 being received between the aforesaid ears 16, Fig. 2. Each ear of the pairs of ears 21 and 22, with the exception of the lower ear 21 at the left, Fig. 2, is provided with a vertical passage, the passages in the respective pairs of ears 16 and 22 being vertically alined for the reception of a pivot screw 23, and the passages in the upper ears 15 and 21 at the left, Fig. 2, being vertically alined for the reception of a detachable retaining screw 24.

The gate 20, at each side thereof, comprises a rearwardly extending bearing section 25. Each bearing section 25 has extending therethrough a slot 25a elongated in a vertical direction for the reception of a horizontal shaft 26 which supports a plurality of web-engaging rollers 27.

In accordance with the invention, levers 28 are pivoted to the gate 20 inwardly of each bearing section 25 thereof, the rear end of each lever 28 having pivoted thereto one end of a link 29, the aforesaid shaft 26 extending through the links 29. The forward end of each lever 28 carries a pivoted armature 29a coactable with an electromagnetic winding 30 suitably secured to said gate 20.

The gate 20 has secured thereto a support 31 which carries an objective lens 32 having its longitudinal axis vertically disposed. Below the objective lens 32, there is disposed an inclined mirror 33 disposed in horizontal alinement with the projection field 14.

The housing 8, at the rear thereof, terminates in a plane vertical surface to which, by screws 34 or the like, is secured a lamp housing 35 which, if desired, may carry a pivoted cover 36, the lamp housing 35 and cover 36 being provided with suitable ventilating passages, not shown. Preferably, one side wall of the lamp housing 35 carries a detachable plate 37 to which is horizontally secured an incandescent lamp bulb which is indicated diagrammatically at 38. As shown in Fig. 1, the projecting light beam passes from right to left from the source of light 38, through an oblong, rectangular aperture 35a provided in the lamp housing 35, through a pair of condenser lenses 39, 40 suitably supported in the aforesaid housing 8 and then through the projection field 14, the projecting light beam thereafter engaging the mirror 33, passing through the objective lens 32 and then engaging a suitable mirror and screen arrangement (not shown).

As illustrated in Fig. 1, the platform 2 may have secured thereto a standard 41 which, by screws 42 or the like, is secured to the rear surface of the lamp housing 35 so as to form a support therefor.

Referring to Figs. 1-4, inclusive, and 9, the rear wall of the aforesaid lamp housing 35 is shown as having a bracket structure 43 secured thereto by screws 44 or the like. The bracket structure 43 comprises a pair of upstanding sections 45, 45 terminating, respectively, at their upper ends in horizontally alined fork-shaped sections 45a which form bearing surfaces for the respective ends of a shaft 46 which is secured to and rotatable with a reel R comprising a hub 47 and spaced, parallel side plate 48, 48.

That upstanding section 45 toward the left, Fig. 9, comprises a laterally extending member 49 which terminates in an upper bearing section 50 having a horizontal passage disposed in alinement with the aforesaid shaft 46. The bearing section 50 supports a shaft 51 terminating at its end toward the left, Fig. 3, in a collar 52 within which the adjacent end of the shaft 46 is freely received. Fixed within the collar 52 is a transverse pin 53 received by an open-end slot diametrically formed in and at the end of said last named end of the shaft 46. Pivoted at 54 to an ear formed on the bearing section 50 is a latching lever 55 having a hook-shaped end adapted to be swung into engagement with that section of the shaft 51 which is exposed at the right of the collar 52, Fig. 3. At the right of the bearing section 50, Fig. 3, the shaft 51 has secured thereto a pulley 56 which is utilizable as hereinafter described.

When the latching lever 55 is positioned as shown in Figs. 3 and 4, the two shafts 46 and 51 are locked together for rotatable movement as a unit. However, when the latching lever 55 is swung clockwise, Fig. 4, the shaft 51 may readily be moved toward the right, Fig. 3, to thereby remove the collar 52 from the adjacent end of the shaft 46 and to remove the pin 53 from the slot in said last named end of the shaft 46. When this has been done, the reel R together with its shaft 46 may readily be removed from the fork-shaped sections 45a which form the support therefor.

The bracket structure 43 serves as a support for a horizontal member 57, Figs. 4 and 9, on which is pivoted a lever 58 biased in a counter-clockwise direction, Fig. 4, by a suitably supported spring 59. One end of the lever 58 forms a support for a roller 60 adapted to engage the outer surface of the web roll on the reel R, said lever 58, adjacent its other end, carrying an adjustable screw 61 coactable with the actuating member 62 of a suitable electrical switch 63 supported by an adjacent section of the bracket structure 43, the latter also carrying an adjustable stop member 64 with which the lever 58 is adapted to engage.

Referring particularly to Figs. 1, 2 and 3, the bracket structure 43 is shown as having secured thereto a housing 65 to which, by screws 66, a front plate 67 is attached. The plate 67 and the rear wall of the housing 65 serve as the supports for a horizontal shaft 68 to which, by a screw 69, is secured a hub 70 carrying a sprocket wheel 71. Loosely mounted on the shaft 68 is a sleeve 72 which carries a screw 73 extending into a groove 68a formed peripherally in the shaft 68, this arrangement preventing movement of the sleeve 72 axially of said shaft 68. The sleeve 72 carries a pulley 74 vertically alined with the above described pulley 56 of the shaft 51, the pulleys 56 and 74 carrying an endless belt 75 of such construction that it is slippable with respect to one or both of the pulleys 56 and 74. One face of the sleeve 72 is serrated so as to form a clutch face with which is coactable a similar clutch face formed on a sleeve 76 which is suitably keyed to the shaft 68 while being freely movable axially thereof.

The inner face of the front plate 67 has projecting therefrom ears 67a, Fig. 3, between which is pivoted a lever 77, the lower intermediate section of which is provided with a circular aperture in which is received the aforesaid sleeve 76, the lever 77 and the sleeve 76 being connected by oppositely disposed pivotal connections 78. The extreme lower end of the lever 77 is provided with a passage through which extends a screw 79 threaded into the front plate 67. A spring 80, confined between the head of the screw 79 and the adjacent section of the lever 77, serves to bias said lever 77 in a counter-clockwise direction, Fig. 3. The upper end of the lever 77 serves as an armature for a pair of coils 81 suitably supported on a bracket 82 carried by the front plate 67.

Referring to Figs. 1 and 2, the bottom wall 9 of the hereinbefore described housing 8 has a bracket structure 83 secured thereto by screws 84a, or equivalent. The bracket structure 83 comprises a pair of depending sections 84, 84 each provided with an open slot at the side thereof, Fig. 1, the bottom surfaces of these slots being horizontally alined and forming bearing surfaces for the respective ends of a shaft 85 carried by a reel R1 having side plates 86.

As shown in Fig. 2, that bracket section 84 toward the left comprises a laterally extending member 87 which terminates in a lower bearing section 88 having a horizontal passage disposed in alinement with the aforesaid shaft 85 of the reel R1. The bearing section 88 supports a shaft 89 having a sprocket wheel 90 secured to one end thereof. The other end of the shaft 89 is detachably secured to the adjacent end of the shaft 85 by an arrangement comprising a latching lever 55 which is similar to that hereinbefore described in connection with the shafts 46 and 51.

The bracket structure 83 serves as a support for a horizontal member 57a, Fig. 1, on which is pivoted a lever 58a biased in a clockwise direction, Fig. 1, by a suitably supported spring 59a. One end of the lever 58a forms a support for a roller 60a adapted to engage the outer surface of the web roll on the reel R1, said lever 58, adjacent its other end, carrying an adjustable screw 61a coactable with the actuating member 62a of a suitable electrical switch 63a supported as, for example, by the lower surface of the lamp housing 35.

Referring to Figs. 2 and 6, that bracket section 84 toward the right is shown as having a side passage 84a which communicates with a passage 84b extending through a projection 84c of said bracket section 84. A metallic ball 91, seated loosely in the passage 84a, is biased toward the left, Fig. 6, by a spring 92 disposed between said ball 91 and a screw 93 threaded into the passage 84b. The ball 91, under spring pressure, engages the adjacent plate 86 of the reel R1 and, as will be understood, serves to apply thereto a force tending to retard rotative movement thereof.

As shown in Fig. 2, that section 45 of the bracket structure 43 toward the left may have associated therewith an arrangement similar to that described immediately above for retarding rotative movement of the reel R.

In accordance with the invention, the hereinbefore described platform 2 carries a housing 94. As herein shown, the housing 94 comprises a top wall 95, a bottom wall 96, vertical end walls 97 and intermediate vertical walls 98, the vertical walls cooperating with each other to form a plurality of narrow stalls or compartments C. In addition, if desired, the housing 94 may comprise front and rear walls, not shown. As will be understood, the various walls are secured to each other in suitable manner so as to form a rigid, unitary structure.

Extending from one end to the other end of the housing 94 are the upper and lower horizontal shafts 99 and 100 which are journalled in suitable manner in some of the described vertical walls.

Referring to Fig. 5, the third compartment C from the left is shown as having therein a hub 101 which is loosely mounted on the shaft 100, said hub 101 carrying an inwardly projecting pin 102 which extends into a groove 100a formed circumferentially in the shaft 100. Accordingly, the hub 101 is freely rotatable on and with respect to the shaft 100 while being restrained from movement axially thereof. The hub 101 comprises a sprocket wheel 103 and a clutch disk 104 having a notched or serrated face. The compartment C last named is also shown as having a sleeve 105 slidably fixed on the shaft 100 by a key 106, or equivalent, the surface of the sleeve 105 facing the disk 104 being notched or serrated as shown.

Disposed in the compartment C last named is a support 107 which may be an integral section of an intermediate wall 98, the support 107 having pivoted thereto a lever 108 which, intermediate its ends, comprises a section 108a having a circular aperture in which the aforesaid sleeve 105 is received. The lever section 108a carries a pair of screws 109 positioned diametrically with respect to the sleeve 105, the inner ends of these screws 109 being received in a groove 105a peripherally formed in said sleeve 105. Below the section 108a, the lever 108 is formed with a passage through which freely extends a screw 110 carried by that intermediate wall 98 which comprises the aforesaid support 107. A helical spring 111 disposed around the outer end of the screw 110 biases the lever 108 in a counter-clockwise direction, Fig. 5, to the extent permitted by a stop screw 112 carried by the upper end of the lever 108. The extreme lower end of the lever 108 carries an armature 113 coactable with the core of a suitably supported electromagnetic winding 114.

Further, the compartment C last named is shown as having therein a hub 115 which is suitably secured to the shaft 99 for rotative movement therewith. Vertically above the aforesaid sprocket wheel 103, the hub 115 comprises a sprocket wheel 116 with which and the sprocket wheel 103 an endless sprocket chain 117 coacts.

Still further, the compartment C last named is shown as having therein a sprocket wheel 118 which is suitably secured to the shaft 99 for rotative movement therewith. The sprocket wheel 118 is disposed vertically below a sprocket wheel 119 secured to the above described shaft 18 and an endless sprocket chain 120 coacts with the two sprocket wheels 118 and 119.

With two exceptions, the apparatus in the other compartments C is a duplicate of that described above with respect to the specified compartment C and, therefore, description of the apparatus in said other compartments will be omitted. The two exceptions are as follows: (1) there is no sprocket wheel 118 in any of the compartments C other than the one described and (2) the sprocket wheels 103 in the respective compartments C progressively increase in diameter in one direction, as from left to right, Figs. 2 and 5, for a purpose hereinafter to be described.

As shown in Fig. 2, the shaft 89, at the end thereof toward the right and inside the housing 94, has secured thereto a sprocket wheel 121 which is disposed in the same vertical plane as the hereinbefore described sprocket wheel 71. An endless sprocket chain 122 coacts with the sprocket wheels 71 and 121 to transfer energy from one to the other.

Referring to Figs. 1 and 2, the shaft 100, at the end thereof toward the right, Fig. 2, is shown as having secured thereto a worm wheel 122a which coacts with and is driven by a worm wheel 123 secured to a shaft 124 which extends from a gear box 125 associated with a suitable electrical motor M carried by the platform 2, the shaft 124 being connected to the motor armature by suitable speed-reducing gearing, not shown.

The platform 2, rearwardly of the housing 94, carries a housing formed by side walls 127, 127 and a top wall 128, this housing forming a stall or compartment C1. The side walls 127, 127 form bearings for upper and lower shafts 129 and 130, the lower shaft 130 leading into a suitable gear box 131 from which a mechanical connection leads to the armature of an electrical motor M1 carried by the platform 2. The shaft 130 supports a sleeve or hub 130a freely rotatable thereon but restrained from movement axially thereof; the sleeve 130a, exteriorly of the compartment C1 having secured thereto a sprocket wheel 133 disposed vertically below a sprocket wheel 134 secured to the shaft 129. An endless sprocket chain 135 connects the sprocket wheel 133 with the sprocket wheel 134 so that power may be delivered from one to the other.

The shaft 129 has secured thereto a second sprocket wheel 136 which is disposed in the same vertical plane as the above described sprocket wheel 90 and an endless sprocket chain 137 is associated with both of the sprocket wheels 90 and 136.

The compartment C1 contains clutch and clutch-actuating mechanism similar to that described above as contained in the compartment C, the same reference characters having been generally applied to corresponding parts. In this connection, it is to be noted that the armature 113 of the lever 108 in the compartment C1 coacts with a suitably supported electromagnetic winding 114a.

In Fig. 8, I have illustrated in a diagrammatic manner the electrical circuit relation of my invention. Thus, I may provide a pair of conductors 150, 151 which include a main switch 152 and suitable fuses 153, the conductors 150, 151 leading to any suitable source of electrical energy such, for example, as a 120-volt, 60 cycles per second alternating current supply.

As shown, the hereinbefore described light source 38 for the projector mechanism may be connected across the conductors 150, 151.

Further, as shown, a source of direct current 154 is connected across the conductors 150, 151. The source 154 may be a rectifier, a motor-generator set, or equivalent so that the output conductors 155, 156 thereof deliver direct current as desired.

Connected to the conductor 155 is a conductor 157 which leads to one terminal of a relay winding 158, the other terminal of which has connected thereto a conductor 159 which includes the contacts of the hereinbefore described switch 63 and leads back to the conductor 156.

Connected to the conductor 157 is a conductor 160 which leads to one terminal of a relay winding 161, the other terminal of which has connected thereto a conductor 162 which includes the contacts of the hereinbefore described switch 63a and leads back to the conductor 156.

The conductor 159 described above, between the relay winding 158 and the switch 63, has connected thereto a conductor 163 which terminates in a switch element 164. The hereinbefore described conductor 162, between the relay winding 161 and the switch 63a, has connected thereto a conductor 165 which terminates in a switch element 166. As shown, the switch elements 164 and 166 are disposed adjacent the end of the conductor 156 so that either of them may be disposed in closed-circuit relation with respect thereto.

Coactable with the relay windings 158, 161 is an armature 167 having connected thereto two conductors 168 and 169. The conductor 168 terminates in one element of a switch 170, the other element of which is connected to the line conductor 151 by a conductor 171. The conductor 169 leads to and is connected to the hereinbefore described conductor 156.

One fixed contact of the relay arrangement has connected thereto a conductor 172 which includes the windings 81 and is connected to the conductor 160. The adjacent fixed contact of said relay arrangement has connected thereto a conductor 173 which includes the winding 114a and, likewise, is connected to said conductor 160.

Another fixed contact of the relay arrangement has connected thereto a conductor 174 which includes the terminals of the motor M and is connected to the line conductor 150. The adjacent fixed contact of said relay arrangement has connected thereto a conductor 175 which includes the terminals of the motor M1 and, likewise, is connected to said line conductor 150. Connected across the terminals of the motor M1 is a conductor 176 which includes the windings 30 connected either in series or parallel relation with each other.

With the form of the invention herein disclosed, twelve of the compartments C are provided and each of these compartments contains a winding 114. Accordingly, in accordance with the invention, twelve two-element switches 180 of duplicate character are provided, these being suitably mounted in position adjacent each other on a panel 181, or equivalent. The corresponding elements of all the switches 180 are connected to a common conductor 182 which leads to and is connected to the aforesaid conductor 155. The other element of all the switches 181 have connected thereto the respective conductors 183 which lead to and are connected to the aforesaid conductor 156, each of the conductors 183 including one of the windings 114.

The closure of any selected switch of the switches 181 may be effected in any suitable manner as, for example, by a plug 184 carried by a flexible cord 185. The plug 184 is formed from metallic material and, if desired, although not necessarily, it may comprise a pair of spaced grooves adapted to receive the respective switch tips when said plug 184 is associated, in circuit-closing relation, with a selected switch 180, the plug 184, therefore, serving to close-circuit those switch tips with which it is associated.

Connected to the respective conductors 156, 163 and 165 are the conductors 156a, 163a and 165a which extend to the panel 181 where the conductors 163a and 165a terminate in the respective switch elements 164a and 166a adapted to be selectively closed on the adjacent end of the conductor 156a.

The relay arrangement comprising the windings 158, 161 is of the type known in the art as a double pole, double throw mechanical locking type relay. Thus, when the winding 158 is energized, the armature 167 is attracted thereto and mechanically locked in position; the lock holding after said winding 158 is deenergized. With the relay in this condition, the winding 161 may be energized to release the previously established lock, attract the armature 167 thereto and establish another mechanical lock holding said armature 167 in the position last noted, the lock last named holding after the winding 161 is deenergized.

In accordance with the invention, the motor M operates at constant speed. Depending upon the particular circuit arrangement in use, said motor M may be of any suitable constant speed type. However, with the circuit arrangement shown in Fig. 8, the motor M, preferably, is a synchronous motor as known in the art. The motor M1 may be either of constant or variable speed. With the circuit arrangement of Fig. 8, said motor M1 may be any alternating current motor suitable for the intended purpose.

In order to place the mechanism herein described in condition for operation, the screw 24 is removed from the position thereof shown in Fig. 2 and the gate 20 is swung to open position. Thereupon, the shaft 85 of a reel R1 having a web W wound thereon is disposed in the seat provided by the slotted bracket sections 84, 84. The end of the web W is then passed upwardly across the projection field 14, over the web-pulling roller 19, over a roller 186 supported by a member 187 upstanding from the lamp housing 35, said end of the web W then being attached to the reel R which is supported in the fork-shaped sections 45a, 45a of the bracket 43. Thereupon, the gate 20 is closed and the screw 24 returned to its seat. With said gate 20 in its closed position, the web-engaging rollers 27 carried thereby engage the web and hold the same in engagement with the web-pulling roller 19.

With the web arrangement described above, the diameter of the web roll on the reel R1 is relatively large. This relatively large web roll holds the lever 58a in such position that it is disengaged from the switch 63a and, accordingly, the latter is open as shown in Fig. 8. However, the diameter of the web roll on the reel R is slight or negligible and, therefore, as will be obvious from a consideration of Fig. 4, the lever 58 is in engagement with the switch 63 and, therefore, the latter is closed as shown in Fig. 8.

Assuming that the armature 167 is locked in the position thereof shown in Fig. 8, the operator, initially, closes the switch 152. As a result, the direct current source 154 is energized to thereby complete a circuit from one terminal of the source 154 by way of the conductor 155, conductor 157, conductor 160, conductor 172 including the windings 81, armature 167, conductor 169 and thence back to the other terminal of said source 154 by way of the conductor 156. When the windings 81 are energized as described, the lever 77 is swung to the position thereof shown in Fig. 3 whereby the clutch face on the sleeve 76 is engaged with the corresponding clutch face on the sleeve 72. In this manner, the sleeve 72 and the thereby-carried pulley 74 are locked to the shaft 68 which, at this time, is stationary.

After closure of the switch 152 as described above, the operator closes the starting switch 170 which may be an ordinary blade switch. By so doing, a circuit is closed from the line conductor 151 by way of the conductor 171, switch 170, conductor 168, the armature 167 and thence to the other line conductor 150 by way of the conductor 174 which includes the actuating winding of the motor M. Accordingly, in this manner, operation of said motor M is effected and, responsive thereto, the shaft 100, Figs. 2 and 5, is caused to rotate at suitable slow, constant speed depending upon the character of the gearing in the gear box 125.

When all of the switches 180 are open, it follows, necessarily, that all of the windings 114 are deenergized and, when deenergized, all of the levers 108 are in their non-attracted positions with respect to said windings 114, respectively. If, at this stage of the operation, the operator inserts the plug 184 in the second switch 180 from the top, Fig. 8, a circuit is closed from one terminal of the direct current source 154 by way of the conductor 155, conductor 182, the contacts of the switch 180 last named, the conductor 183 associated with said switch 180 last named, the winding 114 associated with said conductor 183 last named and thence back to the other terminal of the direct current source 154 by way of the conductor 156.

The winding 114 referred to immediately above occupies the second compartment C from the left, Fig. 5 and, responsive of the energization of said last named winding 114, the lever 108 in said last named compartment C is swung to the position shown against the influence of the spring 111. By so doing, the rotating clutch sleeve 105 in the compartment C last named is moved into engagement with the stationary clutch disk 104 and, by reason of the interacting clutch faces, the clutch disk 104 now rotates as a unit with the clutch sleeve 105.

Responsive to the described rotation of the clutch disk 104, the sprocket chain 117 in the compartment C last noted is operated to effect rotation of the shaft 99 at constant speed. As hereinbefore described, the shaft 99 carries the sprocket wheels 118, 121 which are carried by said shaft 99 and rotate therewith to effect movement of the respective sprocket chains 120, 122.

As described above, the sprocket chain 120 actuates the sprocket wheel 119 and, accordingly, the web-pulling roller 19 is rotated at suitable constant speed to draw the web W upwardly from the reel R1 and across the projection field 14; the rollers 27, under the influence of gravity, holding the web in engagement with the roller 19 at this time. The sprocket chain 122 actuates the sprocket wheel 71, Fig. 3, whereby rotation of the shaft 68 is effected to produce corresponding rotation of the pulley 74 by reason of the fact that the windings 81 are energized at this time. The pulley 74 rotates the endless belt 75 to thereby rotate the pulley 56 whereby the reel R is rotated in the proper direction to wind thereon the web W after it passes beyond the web-pulling roller 19. As the diameter of the web roll on the reel R increases, the belt 75 slips with respect to one or both of the pulleys 56, 74 to compensate for the slower rotative speed of said reel R.

An important feature of the invention relates to the described constant speed of web movement under the control of the web-pulling roller 19 whereby, as a result, the web W moves at constant speed with respect to and across the projection field 14.

As hereinbefore described, the shaft 100 carries a sprocket wheel 103 in each of the compartments C. As clearly appears from a consideration of Figs. 2 and 5, the diameters of the respective sprocket wheels 103 are different. Thus, in accordance with the form of the invention herein shown, the sprocket wheel 103 in that compartment C at the left, Fig. 5, has minimum diameter. The diameter of the sprocket wheel 103 in the second compartment C from the left is slightly greater than that of the one in the adjacent compartment C toward the left. Similarly, there is a progressive increase in the diameters of the sprocket wheels 103 in the other compartments C in a direction from left to right, Figs. 2 and 5, and, preferably although not necessarily, the increment of increased diameter is the same in each case.

With the plug 184, the operator may select that switch 180 which is to be closed and, since the switches 180 control the windings 114 in the respective compartments C, there may be obtained any one of a plurality of different constant speeds of web movement under the control of the web-pulling roller 19 by the selection of a desired switch 180 with which the plug 184 is to be associated.

During the operation described above, the plug 184 was associated with the second switch 180 from the top, Fig. 8, this causing the gear wheel 103 in the second compartment C from the left, Fig. 5, to effect the web-pulling operation. In case the operator desires the web to be pulled at a slower constant speed, the plug 184 is removed from the switch 180 last named and inserted in the uppermost switch 180, Fig. 8. This operation releases the clutch in the second compartment C from the left, Fig. 5, and connects the clutch in that compartment C at the extreme left, Fig. 5. In case it should be desirable to have the web-pulling roller 19 draw the web at some faster, but still constant speed, the operator selects a switch 180 suitable for that purpose and associates the plug 184 therewith.

In the manner described above, the web-pulling roller 19 draws the web from the reel R1 and, under the control of the belt 75, the web is wound upon the reel R. During this operation, due to increase in diameter of the web roll on the reel R, the lever 58 moves counter-clockwise, Fig. 8, whereby the switch 63 opens. This opens the circuit through the relay winding 158 but, due to the mechanical lock described above, no movement of the armature 167 occurs in response to such deenergization of the winding 158.

As the web roll on the reel R1 decreases in size, the lever 58a moves clockwise, Fig. 8, and, when the diameter of the web roll on said reel R1 has decreased to a predetermined extent or has become negligible, the lever 58a moves to close the switch 63a. Responsive to this action, a circuit is completed from one terminal of the direct current source 154 by way of the conductor 155, conductor 157, conductor 160, the relay winding 161, conductor 162 including the contacts of the switch 63a and thence back to the other terminal of said direct current source 154 by way of the conductor 156. The described energization of the relay winding 161 causes the armature 167 to be attracted thereto with consequent disengagement thereof from the upper fixed relay contacts and engagement thereof with the lower fixed relay contacts. At this time, the described mechanical lock becomes effective to hold the armature 167 in the position last described.

As a result of the disengagement of the armature 167 from the upper fixed contacts, the operating circuit of the motor M is opened and, likewise, the circuit through the windings 81 is opened. When the latter happens, the lever 77 swings counter-clockwise, Fig. 3, to open the described clutch and disengage the pulley 74 from driving relation with the shaft 68.

Engagement of the armature 167 with the lower fixed relay contacts completes a circuit which extends from the line conductor 151 by way of the conductor 171, switch 170, conductor 168, armature 167, and thence back to the other line conductor 150 by way of the conductor 175 which includes the winding of the motor M1. When this happens, the motor M1 is energized to effect rotation of the shaft 130, Fig. 2, at suitable speed. Closure of the circuit through the motor M1 also caused closure of the parallel circuit through the windings 30 which, when energized, effect upward movement of the shaft 26 by the described mechanical connections leading thereto from the windings 30, Fig. 1. The shaft 26 supports the hereinbefore described web-engaging rollers 27 and such upward movement of the shaft 26 causes upward movement of the rollers 27 whereby they no longer hold the web in engagement with the web-pulling roller 19.

Downward movement of the armature 167 as described above completes a circuit which extends from one terminal of the direct current source 154 by way of conductor 155, conductor 157, conductor 160, conductor 173 including the winding 114a, the armature 167, conductor 169 and thence back to the other terminal of said direct current source 154 by way of the conductor 156. When the winding 114a is energized as just described, the lever 108 coactable therewith is moved in a clockwise direction, Fig. 2, whereby the clutch mechanism connects the sleeve 130a to the rotating shaft 130. As a result, the sprocket chain 135 transmits power to the shaft 129 from which power is transmitted to the gear wheel 90 by the sprocket chain 137. In this manner, the web W is drawn from the reel R and rewound upon the reel R1.

During an early stage in the operation last described, the lever 58a moves to such position that the switch 63a opens automatically to thereby open the circuit through the winding 161. This, however, has no effect on the position of the armature 167 which, as stated, is held by a mechanical lock at this time.

Operation of the motor M1 and its driving operation on the reel R1 continues until, with a predetermined or negligible amount of the web W remaining on the reel R, the lever 58 becomes effective to close the previously opened switch 63. When this happens, the armature 167 is drawn to its upper position with consequent opening of the circuits of the motor M1, the coils 30 and the winding 114a, opening of the circuit of the coils 30 permitting the rollers 27 to drop into engagement with the web and opening of the circuit of the winding 114a disengaging the clutch in the compartment C1. At the same time, the circuits of the motor M and the windings 81 are reestablished in the manner described above and, therefore, the motor M again becomes effective to pass the web from the reel R1 to the reel R provided, of course, that the plug 184 is associated with one of the switches 180.

With the parts positioned as shown in Fig. 8 and as described, operation of the motor M continues and the web is wound upon the reel R until the switch 63a is closed. In the event that it should become desirable to reverse the direction of web movement prior to the time that the switch 63a is closed, the operator closes the switch element 166 upon the adjacent end of the conductor 156. By so doing, a circuit is closed from the switch element 166 by way of the conductor 165, conductor 162, relay winding 161, conductor 160, conductor 157, conductor 155, the direct current source 154, and thence back to the switch element 166 by way of conductor 156. Energization of the relay winding 161 shifts the armature 167 to its alternate position with the result, first, that the circuits of the winding 81 and the motor M are opened and, second, that the circuits of the winding 114a, the coils 30 and the motor M1 are closed. Accordingly, in the manner described, closure of the switch element 166 upon the adjacent end of the conductor 156 causes the web W to be drawn from the reel R and wound upon the reel R1.

While the motor M1 is operating as last described and with the switch 63 open, the operator may close the switch element 164 upon the adjacent end of the conductor 156 to complete a circuit from said switch element 164 by way of conductor 163, conductor 159, relay winding 158, conductor 157, conductor 155, the direct current source 154, and thence back to the switch element 164 by way of conductor 156. It will be obvious in view of the foregoing description that the completion of the circuit last described causes the web W to be drawn from the reel R1 to the reel R.

In accordance with the invention and as hereinafter more particularly described, the panel 181 is positioned remotely with respect to the projection apparatus whereas the switch 170 and the switch elements 164, 166 are positioned immediately adjacent said projection apparatus. When the arrangement is of this character, it is desirable that conductors 163a, 156a and 165a be connected across the respective conductors 163, 156 and 165 and extended to the control panel 181 where the conductors 163a and 165a terminate in the switch elements 164a and 166a, respectively. From the foregoing operation, it will be understood that alternate operation of the motors M1 and M may be effected by manipulation of the switch elements 164a and 166a in the same manner as was described with respect to the switch elements 164 and 166.

As stated, the switch 170 and the switch elements 164, 166 may be suitably located adjacent the projector mechanism. If desired, the direct current source 154, the relay windings 158, 161 and other parts may be disposed in a box 192 carried by the platform 2, Fig. 1.

When the web W is drawn from the reel R1 by the motor M and, conversely, when said web W is drawn from the reel R by the motor M1, the respective spring-pressed balls 91 cooperate with the adjacent reel side plates 86 and 48 to retard rotation of the respective reels R1 and R. With the present invention, the web W is passed repeatedly in both directions between the reels R1 and R as hereinafter more fully described. Under such circumstances, in order to avoid wear of the web, it is desirable that the pressure retarding movement of the web be applied indirectly thereto as described rather than directly thereto.

By reference particularly to Fig. 7, it will be observed that the clutch sleeves 105 are associated with their respective actuating levers 108 by an arrangement comprising a pair of oppositely related screws 109. This affords pivotal movement of the sleeves whereby the clutching operation is readily effected. A similar arrangement is utilized in connection with the clutch sleeve 76 and pivotal connections 78, Fig. 3.

Figure 10:
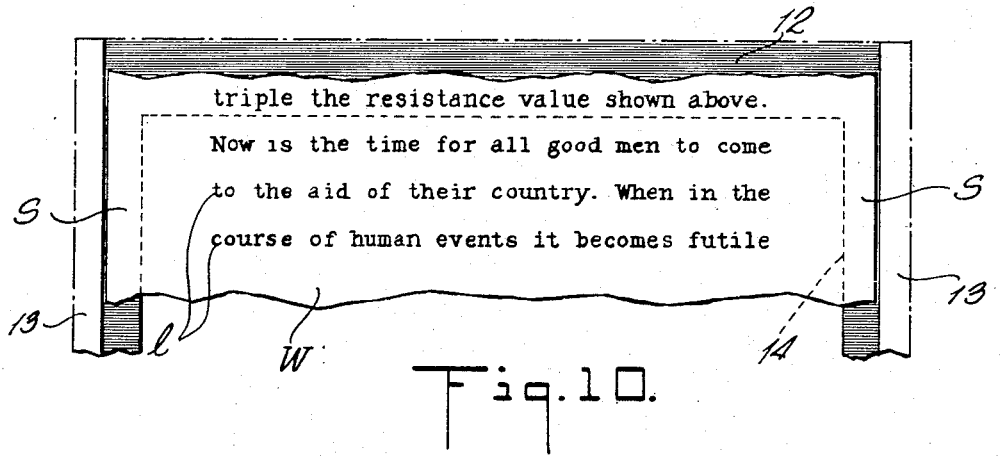
Fig. 10 is an elevational view showing the web of the invention in the projection field of the projector apparatus.

Referring to Fig. 10, there is illustrated a web W of a character adapted to be utilized with the projector mechanism herein disclosed. As shown, the web W is formed from transparent or translucent material such as Cellophane, glassine paper, or equivalent. The web W has thereon transverse lines l formed from rows of any suitable letters or characters and, in accordance with the invention, these lines l are justified at the left margin and, likewise, they should be justified or substantially so at the right margin. In addition, said web W, at each side thereof, comprises marginal strips s which are free from letters or characters, the outer edges of these marginal strips s being adapted to engage the surfaces of the frame 12 disposed at the opposite, respective vertical sides of the projection field 14. Further, in accordance with the invention, each line l contains substantially the same number of letter or character zones as any other line, a letter or character zone being the space occupied by a letter or character or the space between words. The spacing between said lines l may be as desired either single, double or otherwise, or a combination of different spacings, it being desirable, however, that the spacing between certain lines or certain groups of lines be uniform, i. e., single or double, or two single spaced lines followed by a double space, then two single spaced lines, and so on.

As hereinbefore stated, the apparatus of this invention is intended particularly for classroom use. Assuming that the classroom is equipped with desks having thereon typewriters for the use of the students, the described projector mechanism may be located at that end of the classroom toward which the students face and the remote control panel 181 may be positioned at a desired place in the classroom convenient for the use of the instructor.

Then, with the web W wound upon the reel R1 and threaded through the mechanism to the reel R as described, the instructor energizes the motor M in the manner described above. Thereupon, by association of the plug 184 with a selected switch 180, the web W is caused to move through the projection field 14 at a constant speed under the control of the web-pulling roller 19, the web, meanwhile, being unwound from the reel R1 and wound upon the reel R.

The projecting light beam passes through the projection field 14 to the mirror 33, said projecting light beam thereafter passing through the objective lens 32 and then moving into engagement with a suitable mirror-screen system, not shown, the screen preferably being of the rear projection type and so disposed that it faces the classroom. It will be understood that the projecting light beam may pass to the screen otherwise than as described. Thus, for example, said projecting light may pass along a single horizontal path through the projection field, the objective lens and then into engagement with the screen.

As will be understood, images of the lines of characters on the web W appear on the projection screen and move from the bottom to the top thereof in correspondence with the movement of the web through the projection field. The students, with their typewriters before them, view the screen and operate the typewriters to copy the lines of characters appearing on the screen. With a web of the character described and with the plug 184 remaining associated with a selected switch 180, substantially the same number of characters pass through the projection field 14 during each minute of operation. By reason of this feature of the invention, the instructor may readily rate the capability of the class.

It will be understood that the instructor closes that switch 180 which will cause the web to move through the projection field 14 at a constant speed warranted by the experience of the class at hand. Dependent upon the capability of the class, a different constant speed of web movement through the projection field, either faster or slower, may readily be produced by associating the plug 184 with another selected switch 180. Obviously, a class of beginners would start with a low, constant speed of web movement through the projection field. In later lessons, such constant speed would be changed to a higher constant speed in accordance with the progress made by the class.

Eventually, during movement of the web from the reel R1 to the reel R as described above, the switch 63a opens and, automatically with the circuit arrangement of Fig. 8, the web returns to the reel R1 from the reel R. This operation is effected by the motor M1 and, obviously, the speed of web movement under control of said motor M1 should be much faster than any speed of the web which may be produced by the motor M.

When the web W has been rewound upon the reel R1, control of the web is again transferred to the motor M. At this time, the web may again be passed through the projection field for the benefit of the class at hand or the switch 170 may be opened to deenergize the motor circuits.

It will be understood that the characters on the web W may be of any suitable character either upper case or lower case as desired. Further, it is to be understood that the rows of characters on the web W need not necessarily be those of the English alphabet. Thus, for example, rows of stenographic characters or the characters of the stenotype code may appear on the web W so that the class may gain experience in transcribing messages. Also for other kinds of instruction there may be on the web W pictures of animals, followed by the names of the animals, a word in one language followed by its translation into another language, etc., etc. It shall be understood that the expression "characters" shall be construed with sufficient breadth to cover the various letters, pictures and other representatives described above and others the equivalent thereof.

With the circuit arrangement shown in Fig. 8, either the motor M or the motor M1 operates while the switch 170 remains closed although, as stated, the particular motor to be operated may be selected by actuation of either of the switch elements 164 or 166. A more preferred circuit arrangement is shown in Fig. 11 wherein those parts which correspond with the parts shown in Fig. 8 have the same reference characters applied thereto, respectively.

In Fig. 11, I have shown a relay arrangement which comprises a pair of windings 200, 201 disposed on the opposite respective sides of an armature 202 utilizable for actuating, alternately, the movable members 204, 205 formed from electricity-insulating material.

Extending from the hereinbefore described conductor 156 which, as stated, leads to one terminal of the direct current source 154 is a conductor 206 which leads to the inner terminals of both of the windings 200, 201. The other terminal of the winding 200 has connected thereto a conductor 207 which includes the contacts of the hereinbefore described switch 63a and terminates in a switch element 207a at the remote control panel 181. The other terminal of the winding 201 has connected thereto a conductor 208 which includes the contacts of the hereinbefore switch 63 and terminates in a switch element 208a at the remote control panel 181, the two switch elements 207a and 208a being disposed adjacent each other in spaced relation as shown.

Carried by the panel 181 is a three-position switch 209 having a contact element 209a connected to the aforesaid conductor 182 which leads to the conductor 155, the latter leading to one terminal of the direct current source 154. The switch 209 is shown as occupying a neutral position. In another of its positions, the contact element 209a thereof engages the switch element 207a while, in its other position, the contact element 209a engages the switch element 208a.

The relay arrangement of Fig. 11 comprises two upper fixed contacts to which are connected the respective conductors 210 and 211. The conductor 210 includes the above described coils 81 and is connected to the aforesaid conductor 155 which leads to one terminal of the direct current source 154. The conductor 211 includes the operating winding of the motor M and is connected to the aforesaid conductor 151.

The relay arrangement of Fig. 11 further comprises two lower fixed contacts to which are connected the respective conductors 212 and 213. The conductor 212 includes the above described coil 114a and is connected to the aforesaid conductor 210 between the coils 81 and the conductor 155. The conductor 213 includes the operating winding of the motor M1 and is connected to the aforesaid conductor 151, the above described coils 30 being connected in parallel relation across said motor M1.

Connected to the movable member 204 of the relay arrangement of Fig. 11 are the conductors 214 and 215, the similar movable member 205 having connected thereto the conductors 216 and 217. The conductors 214 and 216 are connected to a common conductor 218 which leads to the aforesaid conductor 156. The conductors 215 and 217 are connected to a common conductor 219 which leads to the aforesaid conductor 150.

With the circuit arrangement shown in Fig. 11, the operator, initially, closes the switch 152 and, if the switch 209 is in the neutral position shown, all of the motor operating circuits remain deenergized.

Assuming that all or a predetermined amount of the web W is wound upon the reel R1, the relatively large web roll holds the lever 58a in such position that it is disengaged from the switch 63a and, accordingly, the latter is closed as shown in Fig. 11. However, at this time, the diameter of the webb roll on the reel R is relatively small and, therefore, the lever 58 is in engagement with the switch 63, the latter, accordingly, being open at this time.

Upon the conditions recited, if the operator desires to pass the web W through the projection field from the reel R1 to the reel R, the switch 209 is actuated to move the contact element 209a thereof into engagement with the switch element 207a of the conductor 207. By so doing, a circuit is closed from one terminal of the direct current source 154 by way of the conductor 155, conductor 182, the switch contact element 209a, switch element 207a, conductor 207 including the closed switch 63a, the relay winding 200, conductor 206 and thence back to the other terminal of said direct current source by way of the conductor 156. Closure of the circuit last described effects upward movement of the relay armature 202 and the associated movable member 204 whereby the conductors 214, 215 are closed upon the upper fixed relay contacts, respectively.

In response to the operation last described, a circuit is closed through the motor M from the line conductor 151 by way of the conductor 211, conductor 215 and thence back to the other line conductor 150 by way of the conductor 219. Simultaneously, a circuit is closed through the coils 81 from one terminal of the direct current source 154 by way of the conductor 155, conductor 210 including the coils 81, conductor 214, conductor 218 and thence back to the other terminal of said direct current source 154 by way of the conductor 156. Accordingly, the motor M becomes effective to rotate the hereinbefore described shaft 100, Figs. 2 and 5, and the coils 81 cause the pulley 74 to be connected to the shaft 68, Fig. 3.

In the manner hereinbefore described, the operator may insert the plug 184 of Fig. 11 in a selected switch 180 to thereby energize one of the windings 114 and, by the described clutch mechanism effect rotation of the shaft 99, Figs. 2 and 5, by power obtained from the rotating shaft 100. In response to the operation last noted, the web W is caused to move upwardly through the projection field 14 at suitable constant speed and, as will be obvious in view of the description hereinbefore given, the operator may select any one of a plurality of constant speeds of web movement through said projection field 14 by associating the plug 184 with the proper switch 180.

As the diameter of the web roll on the reel R increases, the lever 58 moves to such position that the switch 63 closes. This, however, has no effect on any of the operating circuits at this time.

Eventually, during continued operation as described above, the web roll on the reel R1 becomes predetermined or negligible diameter and, at this time, the lever 58a becomes effective to open the switch 63a. This operation opens the energizing circuit of the relay winding 200 described above and, as a resule, the armature 202 and the movable member 204 move to normal position as shown in Fig. 11 with consequent deenergization of the circuits through the motor M and the coils 81.

At this time, the web W may be passed from the reel R to the reel R1 and, if so, the switch 209 is actuated to move the contact element 209a thereof into engagement with the switch element 208a of the conductor 208. By so doing, a circuit is closed from one terminal of the direct current source 154 by way of the conductor 155, conductor 182, the switch contact element 209a, switch element 208a, conductor 208 including the closed switch 63, the relay winding 201, conductor 206 and thence back to the other terminal of said direct current source by way of the conductor 156. Closure of the circuit last described effects downward movement of the relay armature 202 and the associated movable member 205 whereby the conductors 216, 217 are closed upon the lower fixed relay contacts, respectively.

In response to the operation last described, a circuit is closed through the motor M1 from the line conductor 151 by way of conductor 213, conductor 217, and thence back to the other line conductor 150 by way of the conductor 219. Closure of the circuit last described causes the coils 30 to be energized whereby upward movement of the shaft 26 is effected to thereby disengage the web-engaging rollers 27 from the web W. Simultaneously, a circuit is closed through the coil 114a from one terminal of the direct current source 154 by way of the conductor 155, conductor 210, conductor 212 including the coil 114a, conductor 216, conductor 218 and thence back to the other terminal of said direct current source 154 by way of the conductor 156. Energization of the coil 114a connects the shaft 130 which is rotating under the control of the motor M1 to the gear wheel 90, Fig. 2, whereby the reel R1 is rotated to cause the web to be rewound thereupon.

As the diameter of the web roll on the reel R1 increases, the lever 58a moves to such position that the switch 63a closes. This, however, has no effect on any of the operating circuits at this time.

Eventually, during continued operation as last described, the web roll on the reel R becomes of predetermined or negligible diameter and, at this time, the lever 58 becomes effective to open the switch 63. As a result, the energizing circuit of the relay winding 201 is opened and, the armature 202 and the movable member 205 move to normal position as shown in Fig. 11 with consequent deenergization of the circuits through the motor M1 and through the coils 30 and 114a. This completes a cycle of operation. Thereafter, the switch 209 may again be actuated in the manner described to cause the web W to move through the projection field from the reel R1 to the reel R.

As hereinbefore described, my invention involves two motors M and M1 utilizable alternately for drawing the web W in opposite directions between the reels R and R1. It shall be understood, however, that the invention is not to be thus limited since, if desired, the motor M alone may be used for effecting movement of the web W in both directions.

Figure 12:
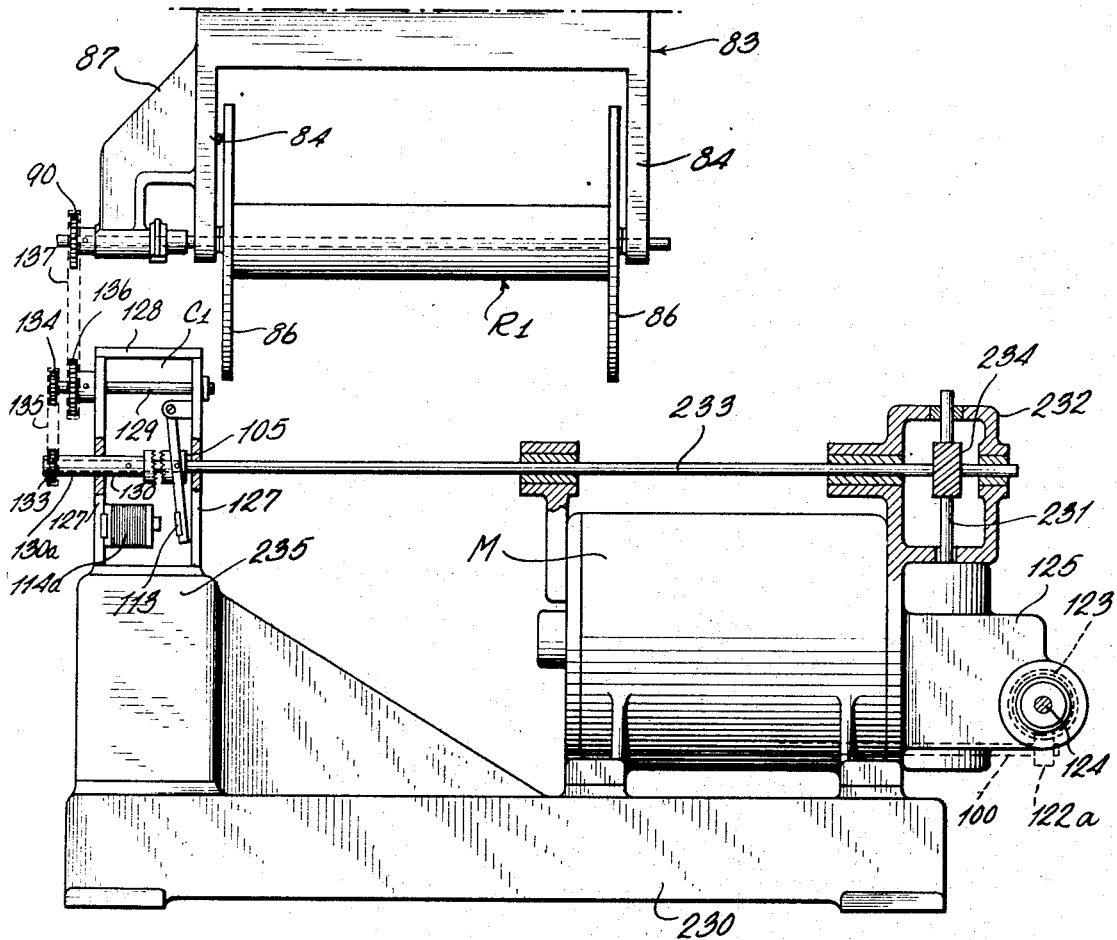
Fig. 12 is an elevational view, partly in section, showing a modification of the invention.

Thus, referring to Fig. 12, I have shown the hereinbefore described motor M as carried by a support 230 which, in turn, is adapted to be carried by the above described platform 2. The gear box 125 of the motor M is illustrated in Fig. 12 as having a vertical shaft 231 extending upwardly therefrom, this shaft 231 being included in the train of speed-reducing gearing between the motor armature and the hereinbefore described shaft 124, said shaft 231 being rotated at higher speed by the motor armature than is the shaft 124. Associated with the gear box 125 is a bearing structure 232 for the aforesaid shaft 231 and for a horizontal shaft 233 rotated by said shaft 231 by suitable worm and worm wheel mechanism indicated at 234.

At one side of the motor M, the support 230 carries a structure 235 on which is mounted a housing which is a duplicate of the housing hereinbefore described as associated with the motor M1 and which has duplicate mechanism associated therewith.

Thus, as shown in Fig. 12, the structure 235 carries a housing formed by side walls 127, 127 and a top wall 128, this housing forming a stall or compartment C1. The side walls form bearings for an upper shaft 129 and for one end of the aforesaid shaft 233 which supports a sleeve or hub 130a freely rotatable thereon but restrained from movement axially thereof, the sleeve 130a, exteriorly of the compartment C1 having secured thereto a sprocket wheel 133 disposed vertically below a sprocket wheel 134 secured to the shaft 129. An endless sprocket chain 135 connects the sprocket wheel 133 with the sprocket wheel 134 so that power may be delivered from one to the other.

The shaft 129 has secured thereto a second sprocket wheel 136 which is disposed in the same vertical plane as the sprocket wheel 90 for the reel R1, an endless sprocket chain 137 being associated with the sprocket wheels 90 and 136.

The compartment C1 of Fig. 12 contains clutch mechanism similar to that described above as contained in the compartment C shown in Fig. 2, the same reference characters having been generally applied to corresponding respective parts.

In Fig. 13, I have shown one form of a circuit arrangement utilizable for operating the form of the invention shown in Fig. 12. As regards Fig. 13, those parts which correspond with the parts shown in Figs. 8 and 11 have the same reference characters applied thereto, respectively.

Referring now to Fig. 13, I have shown a relay arrangement which comprises a pair of windings 240, 241 disposed on the opposite respective sides of an armature 242 utilizable for actuating, alternately, the movable members 244, 245 formed from electricity-insulating material.

Extending from the hereinbefore described conductor 156 which, as stated, leads to one terminal of the direct current source 154 is a conductor 246 which leads to the inner terminals of both of the windings 240, 241. The other terminal of the winding 240 has connected thereto a conductor 247 which includes the contacts of the switch 63a and terminates in a switch element 247a at the remote control panel 181. The other terminal of the winding 241 has connected thereto a conductor 248 which includes the contacts of the switch 63 and terminates in a switch element 248a at said remote control panel 181, the two switch elements 247a and 248a being disposed adjacent each other in spaced relation as shown and the hereinbefore described three-position switch 209 having its contact element 209a coactable alternately therewith, said contact element 209a being connected to the conductor 182 which, in turn, is connected to the conductor 155 leading to one terminal of the direct current source 154.

The relay arrangement of Fig. 13 comprises three upper fixed contacts, the lower contact being single and the upper two contacts being double as shown. Connected to these upper fixed contacts of said relay arrangement are the respective conductors 250, 251, 252, 253 and 254. The conductor 250 includes the above described coils 81 and is connected to the aforesaid conductor 155 which leads to one terminal of the direct current source 154. The conductors 254, 252, 253 and 251 lead to the respective terminals t1, t2, t3 and t4 of the motor M, the conductor 251 including a capacitor 255 as shown.

The relay arrangement of Fig. 13 further comprises four lower fixed contacts, the uppermost and lowermost contacts being single and the intermediate two contacts being double as shown. Connected to these lower fixed contacts of said relay arrangement are the respective conductors 256, 257, 258, 259, 260 and 261. The conductor 256 includes the above described coil 114a and is connected to the aforesaid conductor 250 between the coils 81 and the conductor 155. The conductors 257, 258, 259 and 260 are connected to the aforesaid conductors 253, 252, 251 and 254, respectively. The conductor 261 includes the aforesaid coils 30 and is connected to the line conductor 150.

Connected to the movable member 244 of the relay arrangement of Fig. 13 are the conductors 261a, 262 and 263, the similar movable member 245 of said relay arrangement having connected thereto the conductors 264, 265, 266 and 267. The conductors 261a and 264 are connected to a common conductor 268 which leads to the aforesaid conductor 156. The conductors 262 and 265 are connected to a common conductor 269 which leads to and is connected to the aforesaid conductor 261 in that section thereof between the coils 30 and the line conductor 150. The conductors 263 and 266 are connected to a common conductor 270 which leads to the line conductor 151. The conductor 267 is connected to said conductor 270.

With the circuit arrangement shown in Fig. 13, the operator, initially, closes the switch 152 and, if the switch 209 is in the neutral position shown, all of the motor operating circuits remain deenergized.

Assuming that all or a predetermined amount of the web W is wound upon the reel R1, the large web roll holds the lever 58a in such position that it is disengaged from the switch 63a and, accordingly, the latter is closed as shown in Fig. 13. However, at this time, the diameter of the web roll on the reel R is relatively small compared to the web roll on the reel R1 and, therefore, the lever 58 is in engagement with the switch 63, the latter, accordingly, being open at this time.

Under the conditions recited, if the operator desires to pass the web W through the projection field from the reel R1 to the reel R, the switch 209 is actuated to move the contact element 209a thereof into engagement with the switch element 247a of the conductor 247. By so doing, a circuit is closed from one terminal of the direct current source 154 by way of the conductor 155, conductor 182, the switch contact element 209a, switch element 247a, conductor 247 including the closed switch 63a, the relay winding 240, conductor 246 and thence back to the other terminal of said direct current source by way of the conductor 156. Closure of the circuit last described effects upward movement of the relay armature 242 and the associated movable member 244 whereby the conductors 261a, 262, 263 are closed upon the upper fixed relay contacts, respectively.

In response to the operation last described, a circuit is closed through the coils 81 from one terminal of the direct current source 154 by way of conductor 155, conductor 250 including said coils 81, conductor 261a, conductor 268 and thence back to the other terminal of said direct current source 154 by way of the conductor 156. Simultaneously, a circuit is closed through the motor M from the line conductor 150 by way of conductor 261, conductor 269, conductor 262, conductor 252, the motor terminals t2 and t1 including the motor winding, conductor 254, conductor 263 and thence back to the other line conductor 151 by way of the conductor 270. Across this circuit of the motor M is connected the winding of the motor capacitor circuit, the circuit last named extending from the motor terminals t3, t4 by way of the respective conductors 253, 251 which are connected to the conductors 254 and 252, respectively. Accordingly, with the arrangement of Fig. 13, the motor M becomes effective to rotate both of the shafts 100 and 233, Fig. 12, and the coils 81 cause the pulley 74 to be connected to the shaft 68, Fig. 3. However, inasmuch as the coil 114a, Fig. 12, is deenergized at this time, the described rotation of the shaft 233 is without effect on any part of the mechanism.

In the manner hereinbefore described, the operator may insert the plug 184 in a selected switch 180 to thereby energize one of the windings 114 and, by the described clutch mechanism, effect rotation of the shaft 99, Figs. 2 and 5, by power obtained from the rotating shaft 100 of Fig. 12. In response to the operation last noted, the web W is caused to move upwardly through the projection field 14 at suitable constant speed and, as will be obvious in view of the description hereinbefore given, the operator may select any one of a plurality of constant speeds of web movement through said projection field 14 by associating the plug 184 with the proper switch 180.

As the diameter of the web roll on the reel R increases, the lever 58, Fig. 13, moves to such position that the associated switch 63 closes. This, however, is without effect on any of the operating circuits at this time.

Eventually, during continued operation as described above, the web roll on the reel R1 becomes relatively small in diameter or negligible and, at this time, the lever 58a, Fig. 13, becomes effective to open the associated switch 63a. This operation opens the energizing circuit of the relay winding 240 and, as a result, the armature 242 and the movable member 244 move to normal position as shown in Fig. 13 with consequent deenergization of the circuits through the motor M and the coils 81.

At this time, the web W may be passed from the reel R to the reel R1 and, if so, the switch 209, Fig. 13, is actuated to move the contact element 209a thereof into engagement with the switch element 248a of the conductor 248. By so doing, a circuit is closed from one terminal of the direct current source 154 by way of the conductor 155, conductor 182, the switch contact element 209a, switch element 248a, conductor 248 including the closed switch 63, the relay winding 241, conductor 246 and thence back to the other terminal of said direct current source 154 by way of the conductor 156. Closure of the circuit last described effects downward movement of the relay armature 242 and the associated movable member 245 whereby the conductors 264, 265, 266, 267 are closed upon the lower fixed relay contacts, respectively.

In response to the operation last described, a circuit is closed through the coil 114a from one terminal of the direct current source 154 by way of conductor 155, conductor 250, conductor 256 including said coil 114a, conductor 254, conductor 268 and thence back to the other terminal of said direct current source 154 by way of the conductor 156. Simultaneously, a circuit is closed through the coils 30 from the line conductor 150 by way of conductor 261 including said coils 30, conductor 267 and thence back to the other line conductor 151 by way of the conductor 270. Another simultaneous operation resulting from downward movement of the relay armature 242 involves closure of a circuit through the motor M from the line conductor 150 by way of the conductor 261, conductor 269, conductor 265, conductor 258, conductor 252, the motor terminals t2 and t1 including the motor winding, conductor 254, conductor 260, conductor 266 and thence back to the other line conductor 151 by way of the conductor 270. Across this circuit of the motor M is connected the winding of the motor capacitor circuit, the circuit last named extending from the motor terminals t3, t4 by way of the conductors 253, 257 on the one hand and the conductors 251, 259 on the other hand, the conductor 257 being connected to the conductor 258 and the conductor 259 being connected to the conductor 260.

In the form of the invention shown in Figs. 12 and 13, the motor M is of the type known to the art as a "capacitor type motor without centrifugal switch." A motor of this character comprises a main winding to which the terminals t1, t2 are connected and, in addition, said motor last named comprises another winding to which the terminals t3, t4 are connected. During operation of a motor of this character, the capacitor circuit is connected across the main circuit and, in order to reverse rotation of the motor, it is necessary merely to reverse the connections of the capacitor circuit across the main circuit. With the relay armature 242 in its upper position as described above, the capacitor circuit conductors leading from the terminals t3, t4 are connected to the respective conductors leading to the motor terminals t1, t2, respectively. With the relay armature 242 in its lower position as described above, the capacitor circuit conductors leading from the terminals t3, t4 are connected to the respective conductors leading to the motor terminals t2, t1, respectively. Hence, with the relay armature 242 in its lower position, the motor M rotates in a direction the reverse of that taken while the relay armature 242 is in its upper position.

As will be understood in view of the foregoing description, closure of the circuit last described through the motor M effects reverse-direction rotation of the motor M to produce reverse rotation of the shafts 100, 233 from that described above. The coils 81 are deenergized at this time and, similarly, all of the coils 114 remain deenergized, the plug 184 having been removed, when the web is to be passed from the reel R to the reel R1. Therefore, rotation of the shaft 100 is without effect at this time. However, the circuit of the coils 30 is closed whereby the rollers 27 are held disengaged from the web W and the circuit of the coil 114a is energized to connect the shaft 233, Fig. 12, to the sprocket wheel 90. Therefore, under the influence of the shaft 233, which rotates at a faster speed than the shaft 100, the web W is rewound upon the reel R1.

As the diameter of the web roll on the reel R1 increases, the lever 58a moves to such position that the switch 63a closes. This, however, has no effect on any of the operating circuits at this time.

Eventually, during continued operation as last described, the web roll on the reel R becomes of relatively small diameter or negligible and, at this time, the lever 58 becomes effective to open the switch 63, Fig. 13. As a result, the energizing circuit of the relay winding 241 is opened and, the armature 242 and the movable member 245 come to normal position as shown in Fig. 13 with consequent deenergization of the circuits through the motor M, the coils 30 and the coil 114a. This completes a cycle of operation. Thereafter, the switch 209 may again be actuated in the manner described to cause the web W to move through the projection field from the reel R1 to the reel R.

Although I have shown and described an arrangement for selectively energizing the coils 114 by a plug 184 positioned at the remote control panel 181, it shall be understood that the invention is not to be limited to this particular arrangement since, obviously, there are various other equivalent arrangements which may be substituted therefor. Thus, for example, in lieu of the described plug and switch arrangement, there may be utilized a dial similar to a telephone dial for selectively transmitting impulses, either by wire or wireless, to the coils 114 to energize them individually. It shall also be understood that the remote control panel 181 may be positioned where desired and that, under some circumstances, it may be desirable to position the same immediately adjacent the projector mechanism.

Ordinarily, the levers 58 and 58a operate to open the respective switches when only a negligible amount of the web W remains on the associated reel. It shall be understood that, if desired, the arrangement may be such that each switch noted above is opened when any desired or predetermined amount of the web remains on the reel associated therewith.

As shown in Figs. 2, 3 and 9, each of the shafts 51 and 89 may have secured thereto a knob 280. These knobs 280 serve in an advantageous manner when it becomes desirable to manually rotate one of the reels R or R1 when the web W is associated with the projector mechanism as hereinbefore described.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A projection apparatus including a source of light for illuminating a projection field, an objective lens focused on said projection field, means for drawing a character-bearing web through said projection field, said last named means comprising a motor, a shaft rotated thereby, a second shaft, a plurality of clutch units operable individually to rotate said second shaft by said first shaft at any one of a plurality of different constant speeds, a control station, and means at said station for initiating operation of said motor and for selecting that clutch unit which is to connect said shafts.

2. A projection apparatus including a source of light for illuminating a projection field, an objective lens focused on said projection field, means for drawing a character-bearing web through said projection field, a reel upon which said web is wound for passage through said projection field, said last named means comprising a motor, a shaft rotated thereby, a second shaft, a plurality of clutch units operable individually to rotate said second shaft by said first shaft at any one of a plurality of different constant speeds, a control station, means at said station for initiating operation of said motor and for selecting that clutch unit which is to connect said shafts, and means whereby operation of said motor is discontinued when the diameter of the web roll on said reel decreases to a predetermined extent.

3. A projection apparatus including in combination means providing a projection field through which an indicia bearing web is to move, means furnishing a lens assembly cooperative with said field to cause the projection of images, corresponding to the indicia upon the web on an image receiving surface, web-engaging means adjacent said projection field for moving a web through the same, a plurality of clutch and gear assemblies selectively operable to drive said engaging means at one of a number of predetermined speeds and readily operable manually controlled means positioned exteriorally of said apparatus for governing the selection and operation of said assemblies.

4. A projection apparatus including in combination means providing a projection field through which an indicia bearing web is to move, means furnishing a lens assembly cooperative with said field to cause the projection of images, corresponding to the indicia upon the web, on an image receiving surface, means adjacent said projection field for moving a web through the same, a plurality of driving clutches connectable to said web-moving means to operate the latter at one of a number of predetermined speeds and readily operable manually controlled clutch-selecting means positioned exteriorally of said apparatus for connecting one of said clutches with said web-moving means.

5. A projection apparatus including in combination a web having thereon a plurality of previously provided lines of transversely extending indicia composed of characters and groups of characters spaced from each other; the characters and spaces of a plurality of indicia lines corresponding substantially to the characters and spaces in a preceding and succeeding corresponding number of indicia lines as appearing upon such web, means providing a projection field through which said web is adapted to move, means adjacent said field for cooperating with said web for so moving the same through said field, motor means, assemblies including means providing different ratios of drive, said assemblies being interposed between said motor means and said web-moving means for operating the latter at one of a number of predetermined speeds and manually controlled means accessible from the exterior of said apparatus for causing a selective operation of said assemblies and whereby said web will display through said projection field a substantially predetermined number of characters and spaces during a predetermined interval of operating time.

DAVID F. NEWMAN.